Aug. 19, 1941.  C. O. ROTHWEILER  2,253,095
PROFILING DEVICE
Filed March 7, 1939  3 Sheets-Sheet 1

INVENTOR.
CHARLES O. ROTHWEILER
BY Christian R Nielsen
ATTORNEY.

Aug. 19, 1941.   C. O. ROTHWEILER   2,253,095
PROFILING DEVICE
Filed March 7, 1939   3 Sheets-Sheet 2

INVENTOR.
CHARLES O. ROTHWEILER
BY Christian R. Nielsen
ATTORNEY.

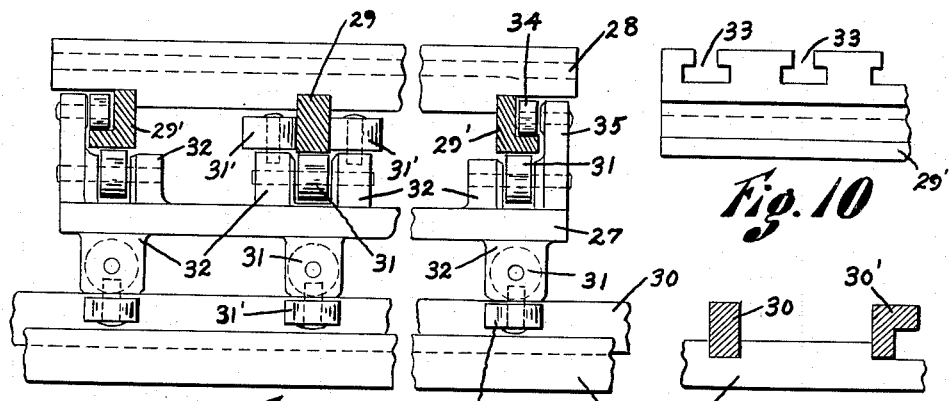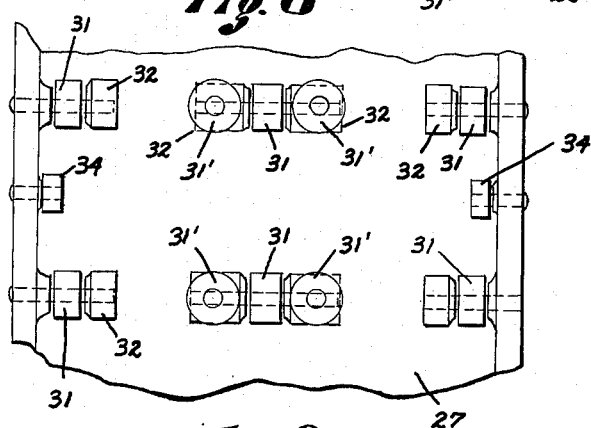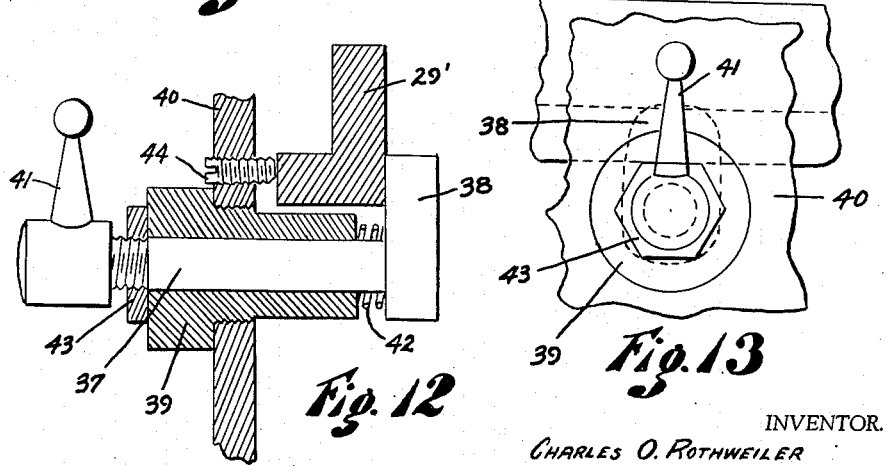

Patented Aug. 19, 1941

2,253,095

UNITED STATES PATENT OFFICE 2,253,095

PROFILING DEVICE

Charles O. Rothweiler, Milwaukee, Wis.

Application March 7, 1939, Serial No. 260,407

6 Claims. (Cl. 90—13.1)

My invention relates to profiling devices and more particularly to a profiling device that is portable and may be used as an accessory to any conventional type of milling machine, both horizontal and vertical.

The object of my invention is to provide a profiling device that may be mounted onto the table of any standard type of milling machine without necessitating mechanical changes.

Another object of my invention is to provide means for adjusting the device and locking it in position to eliminate further adjustments.

A further object of my invention is to provide means for mounting all bearings of the pantograph into an accurate fixed position without necessitating the accurate machining of parts imperative where adjustment is not provided. This feature saves labor and reduces the cost of building the device.

A still further object of my invention is to provide a pantograph that will permit reducing in the profiling operation and may be set by graduation to any degree of reduction depending on the range of the device.

Other and further objects of my invention will become more apparent as the description proceeds when taken in conjunction with the drawings in which Figure 1 is a plan view of the device illustrating the adjustable pantograph and the movable table actuated by it.

Figure 8 is a fragmentary cross-sectional view of the adjustable table carriage and guide rail arrangement illustrating the mounting of the rollers.

Figure 9 is a plan view of the roller arrangement of the adjustable table.

Figure 10 is an end view of a corner of a surface plate illustrating a conventional type of mounting slots.

Figure 11 is a cross-section of the guide rails mounted to a section of the table.

Figure 12 is a cross-section of a locking means mounted to the carriage for retaining it in a fixed position and Figure 13 is an end view of the locking means shown in Figure 12.

Figure 1:
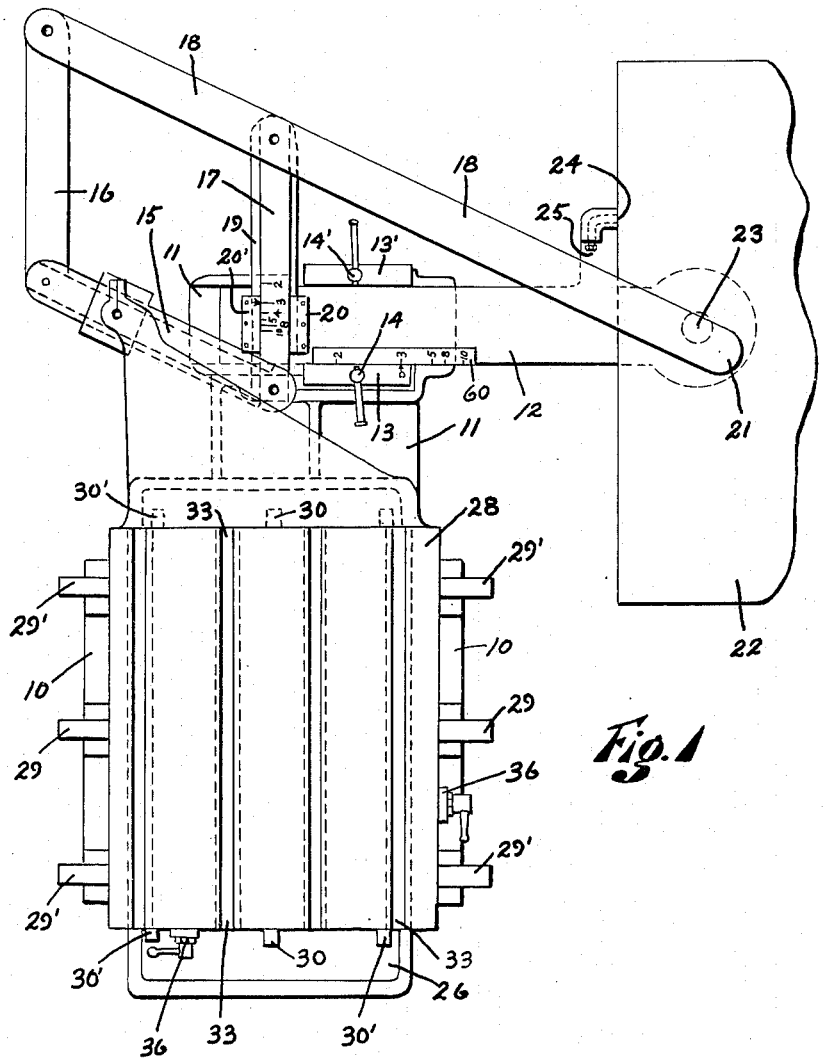

Similar characters of reference indicate corresponding parts throughout the several views and referring now to the same, the character 10 indicates a table arrangement disposed for attachment to the table of any conventional type of milling machine not shown. The table 10 has a projecting member 11 extending outward from it and used as a guide and support for the sliding member 12. The sliding member 12 is slidably supported by the projecting member 11 in the ways 13 and 13' held in position and adjustably fastened by the clamping screws 14 and 14'.

A pantograph consisting of levers 15, 16, 17 and 18 is slidably supported in a mounting plate 19. This mounting plate is adjustably attached to the sliding member 12 by means of the guides 20 and 20'. The depending end 21 of the tracer arm 18 forming a part of the pantograph is arranged to receive a tracing tool not shown and the design being traced is rigidly mounted to the table 22. This table 22 is swiveled at a point 23 on the sliding member 12 and is held in a pre-determined position by the stop 24 as shown and which is made adjustable by means of the screws 25.

There is a base plate 26 disposed for mounting onto a table of a milling machine. This plate 26 supports a carriage 27 and the carriage 27 supports a surface plate 28. Imbedded into the top of the base plate 26 are guide rails 30 and 30' laterally disposed in relation to the base plate 26 and in the bottom of the surface plate 28 are guide rails 29 and 29' longitudinally disposed in relation to the table 26. The carriage 27 is provided with a plurality of rollers 31 and 31' journaled on bearings supported by the members 32 which project outward from the body of the carriage 27. The rollers 31 carry the downward thrust of the surface plate 28 against the horizontal face of the guide rails 29, 29', 30 and 30' while the rollers 31 contact the vertical surfaces of the guide rails 29, 29', 30 and 30' thereby keeping the carriage 27 in proper alignment and permitting the surface plate 28 to be moved longitudinally as well as laterally.

The surface plate 28 is provided with conventional grooves 33 for fastening parts to be machined in a rigid position.

The guide rails 29' and 30' are angular in shape to provide a means for engagement with the auxiliary rollers 34 journaled in auxiliary bearings 35 on the carriage 27 to retain the surface plate 28 and the base plate 26 in an assembled position as one unit with the carriage 27.

Clamping members 36 shown as an assembly in Figures 12 and 13 act as retaining means to support the surface plate 28 and the base plate 26 in stationary relation with the carriage 27. The assembly consists of a threaded member 37 having an eccentric cam 38 and mounted into a sleeve member 39 which is supported by an angularly projecting member 40 which is integral with the body plate of the carriage 27. The threaded member 37 is rotated by means of the projecting lever 41 and a compression spring 42 acts as a means for releasing the eccentric cam 38 from its contact with the inner face of the rail 29' when the adjusting nut 43 is released. To prevent unnecessary adjustment by the member 37 a separate threaded member 44 is employed and shown mounted in the projecting member 40. This threaded member 44 is adjusted to allow for the necessary clamping action and is left in the adjusted position by the operator.

Figure 2:
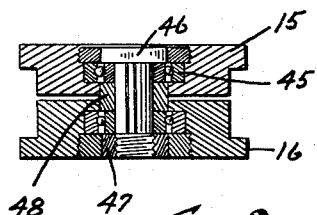
Figure 2 is a cross-sectional view of bearings employed at the three depending points of the pantograph.

In the pantograph assembly where the lever 16 is pivotally connected to the levers 15 and 18 as well as the pivoted connection of the levers 15 and 17, bearings shown in Figure 2 are employed. This bearing assembly consists of two commercially standard ball-bearing assemblies 45 having their outer races mounted into the levers shown as 15 and 16 and their inner races mounted to a threaded center pin 46 held in position by the clamping nut 47 as shown. There is a center sleeve member 48 contacting the sides of the inner races of the ball-bearing assembly 45 and keeping them in an assembled position by means of the center pin 46. This type of bearing construction permits free and easy swivel movements of the pantograph levers at the points of their connection.

Figure 3:
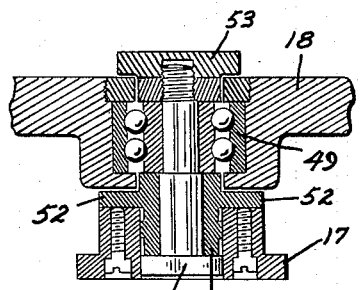
Figure 3 is a cross-section of the adjustable bearing employed on the pantograph at a point mid-way on the tracer arm.
Figure 5:
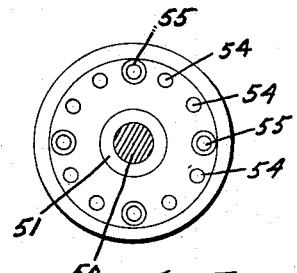
Figure 5 is a plan view of the adjustable bearings illustrating the manner of mounting the adjustment screws.

In Figure 3 I show the adjustable swivel connection employed at the point where the lever 17 connects with the tracer arm of the pantograph. A commercially standard ball-bearing assembly 49 is employed and mounted into the lever 18 as shown. A center pin 50 is encircled with a tubular sleeve 51. This sleeve 51 has an outwardly extending flange 52 and the center pin is rigidly held by the means of a threaded nut 53 as shown. There are guide pins 54 as shown in Figure 5 and adjustment screws 55 engage the flange 52 through the lever 17. These adjustment screws 55 make it possible to properly align the tubular sleeves 51 thereby bringing the pin 50 in a vertical position and allowing for any minor mechanical defects that may take place in the machining of the parts.

Figure 4:
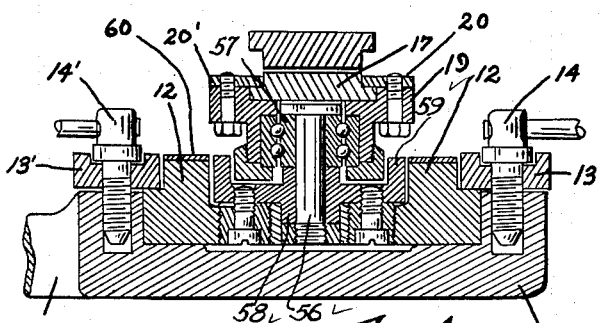
Figure 4 is a cross-section of the adjustable bearing at the graduated point of support for the pantograph.

The graduated mounting where the pantograph lever 17 engages the sliding member 12 is shown in Figure 4. The member 12 is supported by the projecting member 11 of the base 10 and is clamped to the ways 13 and 13' which are made operative by the clamping screws 14 and 14' respectively. There is a center pin 56 engaging the inner race of the double ball-bearing 57 which is mounted into the plate 19 as shown. A tubular sleeve 58 encircling the pin 56 also contacts the inner race of the ball-bearing 57. This sleeve 58 is also provided with a flange 59 and guide pins 54 together with adjusting screws 55 are employed to properly align the pin 54 in a vertical position to permit free and easy manipulation of the pantograph. The graduated scale 60 acts as an indicator to determine the correct adjustment in relation with the indicating guide plates 20 and 20'.

Figure 6:
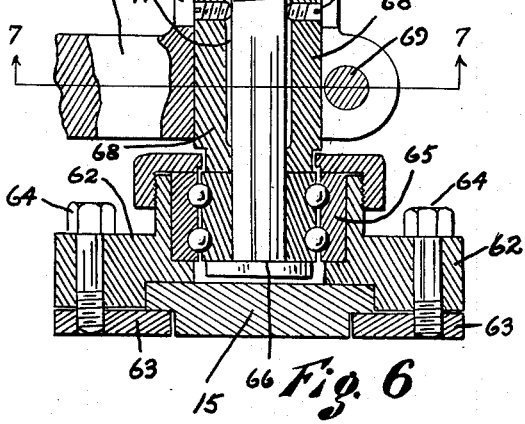
Figure 6 is a cross-section of the bearing permitting vertical adjustment at the point of mounting the table arrangement to the pantograph.
Figure 7:
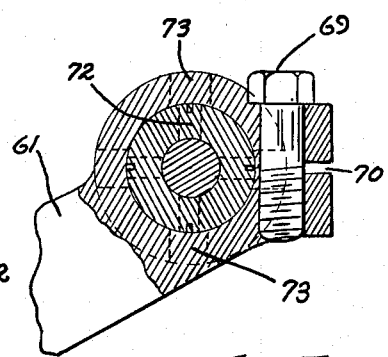
Figure 7 is a cross-section of Figure 6 taken at the line 7—7 of Figure 6.

In Figures 6 and 7 I illustrate the method employed for constructing the swivel connection at the point where the pantograph lever 15 contacts the projecting arm 61 of the surface plate 28. The lever 15 has a slidable shoe 62 clamping the lever 15 by means of the plate 63 held by the screw 64 as shown. This shoe 62 also supports the double ball-bearing 65 at its outer ball race. There is a center pin 66 holding the inner ball race by means of a threaded nut 67 against the tubular sleeve 68. This sleeve 68 is inserted into the projecting end 61 which is shown divided on one side at 70 to allow for rigid attachment to the sleeve 68 when a bolt 69 is securely fastened therein. The tubular sleeve 68 is provided with a space 71 surrounding a portion of the center pin 66 at the upper end of the sleeve 68 and a plurality of set screws are inserted into the sides of the sleeve 68 at its upper end. By engaging some of the screws 72 and releasing the balance a perfect vertical adjustment may be maintained to assist in the manipulation of the bearings. To allow access to the screws 72, slots 73 are provided in that part of the projecting arm 61 that clamps around the sleeve 68 as shown.

It is obvious to anyone familiar with devices of this type that the pantograph properly clamped to correspond at the graduations on the scale 60 and 20, will permit a reduction of any design traced at the point 21 as the pivoted action of the pantograph will permit the movement of the surface plate 28 in a longitudinal or parallel plan on the table 10 by means of the rollers on the top and bottom of the carriage 27 acting on the guide rails 29, 29' 30 and 30' or the plate 28 may be kept from further movement by means of the clamp 36 acting on the rails 29' and 30'.

I have entered into a detailed description of the construction and relative arrangement of parts embraced in the present and preferred embodiment of my invention in order to impart a full, clear and exact understanding of the said embodiments. I do not desire, however, to be understood as confining myself to the said specific construction and relative arrangement of parts inasmuch as in the future practice of the invention various changes and modifications may be made such as fall within the scope of the invention as defined by my appended claims.

Having thus described my invention what I desire and claim to secure by Letters Patent in the United States is:

1. A profiling device of the character described to be used in combination with a milling machine, a pantograph structure, said pantograph structure provided with a tracing device mounted onto the tracer arm of said pantograph, a surface plate mounted onto the reproducing arm of said pantograph, a base plate for mounting onto said milling machine and an auxiliary carriage intermediately disposed between said surface plate and base plate, said auxiliary carriage provided with a plurality of rollers, said base plate and surface plate provided with guide rails arranged to engage said rollers so as to allow free movement of said surface plate under cutters on said milling machine, when said plate is actuated by said pantograph.

2. A profiling device of the character described to be used in combination with a milling machine comprising a pantograph structure having a tracer arm and a reproducer arm, a tracing device attached to said tracer arm, a surface plate mounted onto said reproducing arm, a base plate for mounting onto a milling machine table, a plurality of rail guides mounted onto said surface plate and base plate, an auxiliary carriage, a plurality of rollers journaled in bearings mounted onto said auxiliary carriage, said rollers arranged for engagement with said guide rails to permit free lateral and longitudinal movement of said surface plate, by means of the action of said pantograph, and clamping means on said carriage for arresting the lateral and longitudinal movement of said surface plate.

3. A profiling device of the character described for use with a conventional type of milling machine comprising in combination a pantograph structure having a tracer arm and a reproducing arm, a tracing device attached to said tracer arm, a surface plate mounted onto said reproducing arm, a base plate, means for adjustably mounting said pantograph to said base plate, a plurality of rail guides mounted onto said surface plate and base plate, an auxiliary carriage intermediately disposed between said surface plate and base plate, a plurality of rollers journaled in bearings mounted onto said auxiliary carriage, said rollers arranged for engagement with said guide rails to permit free lateral and longitudinal movement of said surface plate by the action of said pantograph and clamping means on said carriage for arresting the lateral and longitudinal movement of said surface plate.

4. An auxiliary profiling device of the character described comprising in combination a pantograph structure to be used in combination with a standard milling machine having a tracer arm and a reproducer arm, a tracing device attached to said tracer arm, a surface plate mounted to said reproducing arm, an adjustable bearing provided with a set screw arrangement for properly aligning said surface plate to said reproducing arm, a base plate, means for slidably mounting said pantograph structure to said base plate, a plurality of rail guides mounted onto said surface plate and base plate, an auxiliary carriage intermediately disposed between said surface plate and base plate, a plurality of rollers journaled in bearings mounted onto said carriage, said rollers arranged for engagement with said guide rails to permit free lateral and longitudinal movement of said surface plate in relation to the cutters on said milling machine, and clamping means on said carriage for arresting the lateral and longitudinal movement of said surface plate.

5. An auxiliary profiling device to be used in combination with a milling machine, said device comprising in combination a pantograph structure having a tracer arm and a reproducer arm, a tracing device attached to said tracer arm, a surface plate mounted onto said reproducing arm, a base plate, slidable means for adjustably mounting said pantograph to said base plate, graduated guides on said pantograph and base plate to allow accurate setting of said slidable means, a plurality of rail guides mounted onto said surface plate and base plate, an auxiliary carriage, a plurality of rollers journaled in bearings mounted onto said auxiliary carriage, said rollers arranged for engagement with said guide rails to permit free lateral and longitudinal movement of said surface plate due to the actuation of the reproducer arm and clamping means on said carriage for arresting the lateral and longitudinal movement of said surface plate.

6. A profiling device as described in claim 5 in which the slidable means for adjustably mounting said pantograph are provided with clamping members to retain the pantograph in a fixed position with relation to said base plate.

CHARLES O. ROTHWEILER.